US012673879B2

(12) United States Patent
Taniguchi

(10) Patent No.: US 12,673,879 B2
(45) Date of Patent: Jul. 7, 2026

(54) WATER PURIFIER CARTRIDGE, WATER PURIFIER INCLUDING THE SAME, AND WATER PURIFYING MEMBER

(71) Applicant: UNITIKA LTD., Osaka (JP)

(72) Inventor: Shinji Taniguchi, Uji (JP)

(73) Assignee: UNITIKA LTD., Osaka (JP)

( * ) Notice: Subject to any disclaimer, the term of this patent is extended or adjusted under 35 U.S.C. 154(b) by 730 days.

(21) Appl. No.: 18/012,372

(22) PCT Filed: Jun. 9, 2021

(86) PCT No.: PCT/JP2021/022004
§ 371 (c)(1),
(2) Date: Dec. 22, 2022

(87) PCT Pub. No.: WO2021/261255
PCT Pub. Date: Dec. 30, 2021

(65) Prior Publication Data
US 2023/0249985 A1    Aug. 10, 2023

(30) Foreign Application Priority Data

Jun. 23, 2020    (JP) ................................. 2020-108290

(51) Int. Cl.
*C02F 1/00* (2023.01)
*C02F 1/28* (2023.01)
(52) U.S. Cl.
CPC ................ *C02F 1/003* (2013.01); *C02F 1/28* (2013.01); *C02F 2201/006* (2013.01); *C02F 2307/02* (2013.01)
(58) Field of Classification Search
None
See application file for complete search history.

(56) References Cited

U.S. PATENT DOCUMENTS 5,919,365 A * 7/1999 Collette .................. C02F 1/003
210/473
6,136,189 A 10/2000 Smith et al.
(Continued)

FOREIGN PATENT DOCUMENTS

JP          2016-2529 A      1/2016
WO     WO 2006/021966 A1    3/2006
WO     WO 2013/031378 A1    3/2013

OTHER PUBLICATIONS

International Search Report, issued in PCT/JP2021/022004, PCT/ISA/210, dated Aug. 24, 2021.
(Continued)

*Primary Examiner* — Benjamin L Lebron
*Assistant Examiner* — Eric J McCullough
(74) *Attorney, Agent, or Firm* — Birch, Stewart, Kolasch & Birch, LLP

(57) ABSTRACT

The present invention is a water purifier cartridge to be attached to a container including a water storage portion having an opening at an upper portion thereof, and a lid that has an outlet for discharging water stored in the water storage portion and is configured to close the opening of the water storage portion, the cartridge including: a support including a circumferential wall portion formed in a cylindrical shape and a closing portion that closes one end portion in an axial direction of the circumferential wall portion and in which an air hole is formed, another end portion in the axial direction being open; and a filter member that is supported by the support so as to extend along the circumferential wall portion.

7 Claims, 14 Drawing Sheets

(56)        References Cited

U.S. PATENT DOCUMENTS

| | | | |
|---|---|---|---|
| 8,926,840 B2 | 1/2015 | Hull et al. | |
| 2005/0279768 A1 | 12/2005 | Chatrath | |
| 2010/0326921 A1* | 12/2010 | Elizalde Gonzalez | C02F 1/286 |
| | | | 210/660 |
| 2014/0217056 A1 | 8/2014 | Parekh et al. | |
| 2014/0339177 A1* | 11/2014 | Lane ......................... | A45F 3/18 |
| | | | 222/190 |
| 2015/0122710 A1 | 5/2015 | Hull et al. | |
| 2016/0167980 A1 | 6/2016 | Dani et al. | |
| 2016/0339371 A1 | 11/2016 | Cupit | |
| 2018/0265374 A1 | 9/2018 | Dani et al. | |
| 2019/0291926 A1 | 9/2019 | Parekh et al. | |
| 2022/0331719 A1* | 10/2022 | Stehle ................... | B01D 29/23 |

OTHER PUBLICATIONS

Written Opinion of the International Searching Authority, issued in PCT/JP2021/022004, PCT/ISA/237, dated Aug. 24, 2021.
Extended European Search Report for European Application No. 21829824.8, dated Jun. 3, 2024.

* cited by examiner

WATER PURIFIER CARTRIDGE, WATER PURIFIER INCLUDING THE SAME, AND WATER PURIFYING MEMBER

TECHNICAL FIELD

The present invention relates to a water purifier cartridge, a water purifier including the same, and a water purifying member.

BACKGROUND ART

In recent years, water purifiers of various forms have been proposed. For example, in Patent Literature 1, a columnar filter member is provided inside a portable water supply main body, and purified water that has been filtered by passing through this filter member can be drunk from the mouth of the portable water supply main body.

CITATION LIST

Patent Literature

Patent Literature 1: JP 2016-2529A

SUMMARY OF INVENTION

Technical Problem

The above-described water purifier is configured to filter water passing through the columnar filter member from a lower surface toward an upper surface of the filter member. However, in this configuration, since the water passage distance is long, there is a problem in that the pressure loss is large and the filtration speed is slow. The present invention has been made to solve the above-described problems, and aims to provide a water purifier cartridge, a water purifier including the same, and a water purifying member that can increase the filtration speed.

Solution to Problem

The present invention is a water purifier cartridge to be attached to a container including a water storage portion having an opening at an upper portion thereof, and a lid that has an outlet for discharging water stored in the water storage portion and is configured to close the opening of the water storage portion, including: a support including a circumferential wall portion formed in a cylindrical shape, and a closing portion that closes one end portion in an axial direction of the circumferential wall portion and in which an air hole is formed, another end portion in the axial direction of the circumferential wall portion being open; and a filter member that is supported by the support so as to extend along the circumferential wall portion, in which the support is configured to be detachably attached to the container, and when the support is attached to the container, a closed space is formed between an inner space of the support and the lid, and the water in the water storage portion flows from outside of the circumferential wall portion into the inner space via the filter member and is dischargeable from the outlet via the inner space.

The above-described cartridge can be attached to the container such that the air hole is located opposite to the outlet with respect to an axis of the support.

In the above-described cartridge, the filter member can be formed in a sheet shape, the circumferential wall portion of the support can include an inner cylinder configured to be permeable by water, and an outer cylinder that is placed on the inner cylinder and is configured to be permeable by water, and the filter member can be disposed over approximately an entire circumference between the inner cylinder and the outer cylinder.

In the above-described cartridge, the filter member can be wrapped around the entire circumference of the inner cylinder such that one end portion and another end portion in a circumferential direction of the filter member overlap each other, and a recessed portion for receiving a portion of the filter member at which the one end portion and the other end portion overlap each other can be formed in an inner circumferential surface of the outer cylinder.

In the above-described cartridge, the filter member can be formed into a cylindrical shape so as to detachably cover at least one of an outer surface and an inner surface of the circumferential wall portion of the support.

In the above-described cartridge, the filter member can be made of felt.

A water purifier according to the present invention includes: a container including a water storage portion having an opening at an upper portion thereof, and a lid that has an outlet for discharging water stored in the water storage portion and is configured to close the opening of the water storage portion; and any one of the cartridges described above, which is detachably attached to the container.

A water purifying member according to the present invention is a water purifying member to be attached to a water storage portion having an opening at an upper portion thereof, including: a lid that has an outlet for discharging water stored in the water storage portion and is configured to close the opening of the water storage portion; a support including a circumferential wall portion formed in a cylindrical shape, a closing portion that closes one end portion in an axial direction of the circumferential wall portion and in which an air hole is formed, another end portion in the axial direction of the circumferential wall portion being open; and a cylindrical filter member that is detachably attached to the support so as to cover at least one of an inner surface and an outer surface of the circumferential wall portion, in which another end portion of the support is configured to be detachably attached to the lid, and when the support is attached to the lid, a closed space is formed between an inner space of the support and the lid, and the water in the water storage portion flows into the inner space via the filter member and is dischargeable from the outlet via the inner space.

In the above-described water purifying member, a flange portion is formed on the one end portion side of the support, and the filter member is supported between the flange portion and the lid.

Advantageous Effects of the Invention

According to the present invention, the filtration speed can be increased.

DESCRIPTION OF EMBODIMENTS

A. First Embodiment

1. Overview of Water Purifier

Figure 1:
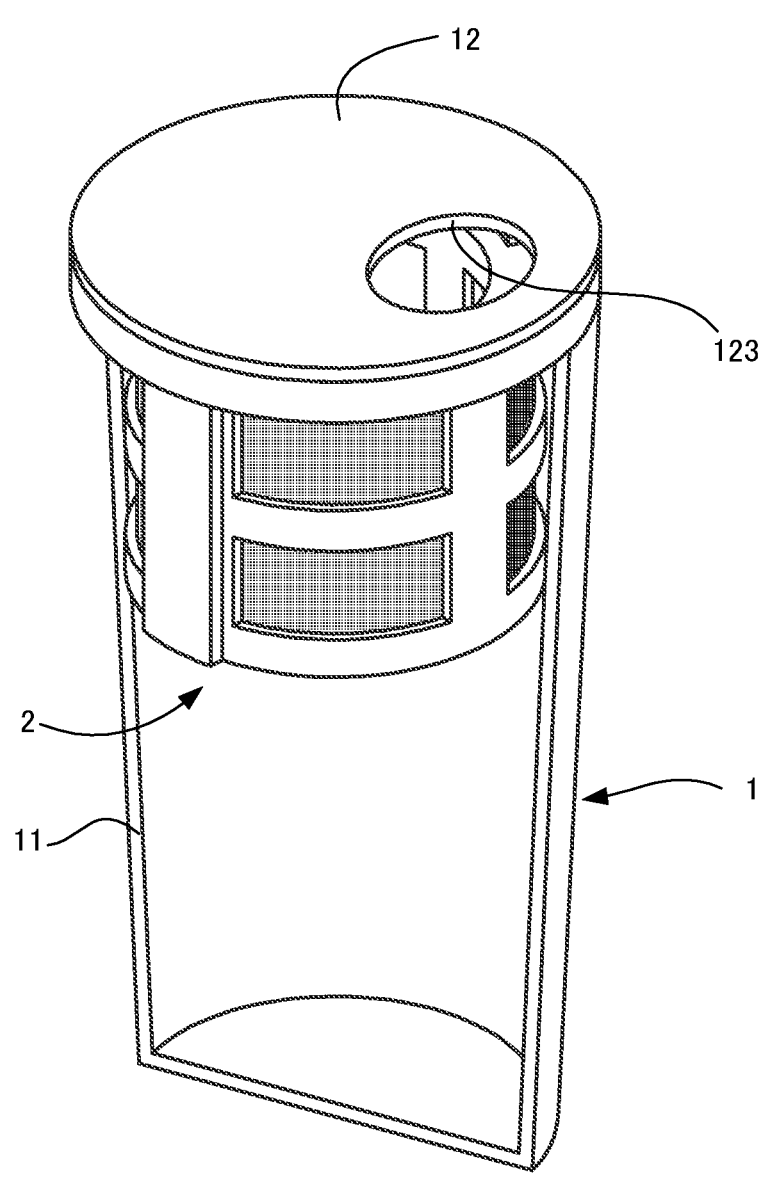
FIG. 1 is a partial cutaway perspective view showing a first embodiment of a water purifier of the present invention.

Hereinafter, one embodiment of a water purifier cartridge according to the present invention and a water purifier having a container to which the cartridge is attached will be described with reference to the drawings. FIG. 1 is a partially cut-away perspective view of the water purifier according to the present embodiment. As shown in FIG. 1, this water purifier includes a container (tumbler) 1 and a cartridge 2 accommodated therein. These will be described in detail below.

2. Overview of Container

As shown in FIG. 1, the container 1 includes a water storage portion 11 that has an opening at an upper portion thereof and is for storing water, and a lid 12 for closing the opening at the upper portion of the water storage portion 11. The water storage portion 11 is formed in a cylindrical shape with an upper portion that is open.

Figure 2:
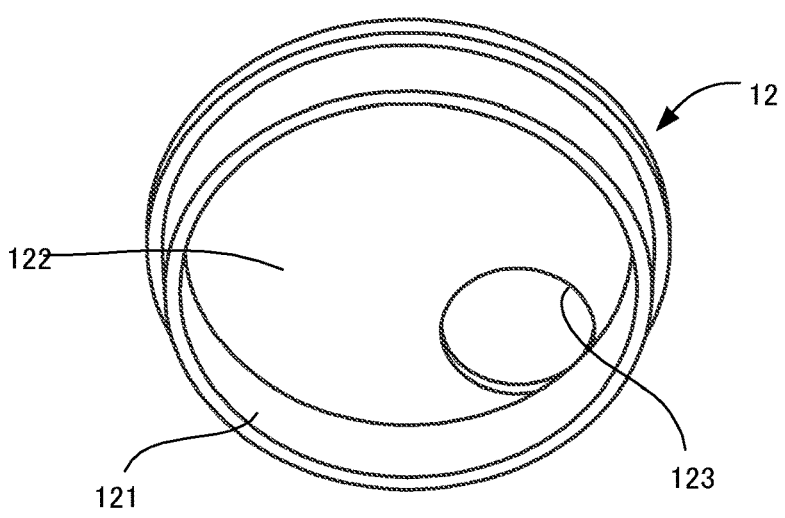
FIG. 2 is a perspective view of a lid as viewed from below.

FIG. 2 is a perspective view of the lid as viewed from below. As shown in FIGS. 1 and 2, the lid 12 has a cylindrical attachment portion 121 and a lid main body 122 that closes the upper portion of the attachment portion 121. The attachment portion 121 is detachably attached to the upper opening of the water storage portion 11. For this reason, the outer diameter of attachment portion 121 and the inner diameter of the upper opening of water storage portion 11 are approximately the same size. An annular O-ring (not shown) is attached to the entire outer circumferential surface of the attachment portion 121 in the circumferential direction, and due to this O-ring being disposed between the inner circumferential surface of the opening at the upper portion of the water storage portion 11 and the outer circumferential surface of the attachment portion 121, both are liquid-tightly fixed. Note that there is no particular limitation on the method for fixing the attachment portion 121 and the water storage portion 11 to each other as long as they are detachable, and various modes such as a screw type can be employed.

The lid main body is formed in a disc shape and has an outer diameter that is slightly larger than that of the attachment portion. Also, a circular drinking port (outlet) 123 is formed at a position displaced outward in the radial direction from the center of the lid main body 122, and water in the water storage portion 11 is discharged via this drinking port 123. The drinking port 123 is formed to be large enough for water to be discharged therefrom, and although a user can drink water from the drinking port 123 when the user puts his or her mouth on the drinking port 123, air flows into the drinking port from the outside at the same time. Note that a closing member that closes the drinking port 123 in an openable and closable manner is attached to the lid main body 122, but this is not shown in the drawings.

3. Overview of Cartridge

Figure 3:
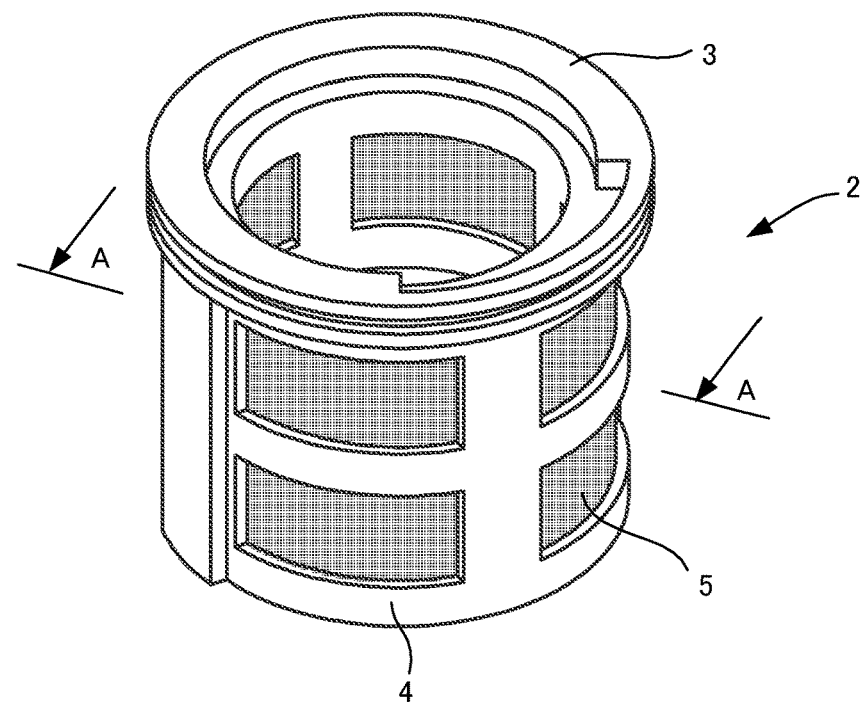
FIG. 3 is a perspective view of a cartridge as viewed from above.
Figure 4:
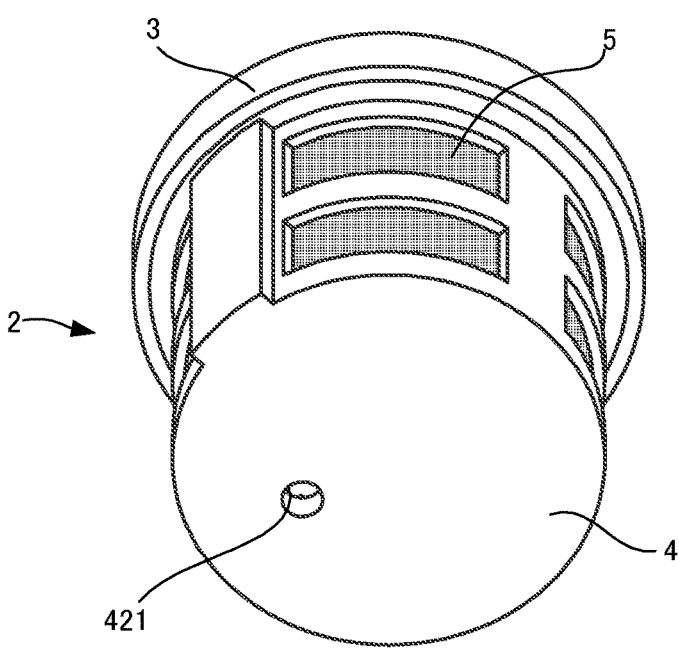
FIG. 4 is a perspective view of the cartridge as viewed from below.

Next, the cartridge 2 will be described with reference to FIGS. 3 and 4. FIG. 3 is a perspective view of the cartridge as viewed from above, and FIG. 4 is a perspective view of the cartridge as viewed from below. As shown in FIGS. 3 and 4, the cartridge 2 includes a cylindrical inner cylinder 3, a cylindrical outer cylinder 4 in which the inner cylinder 3 is fitted, and a filter member 5 disposed between the inner cylinder 3 and the outer cylinder 4, and the upper end portion of the inner cylinder 3 is detachably attached to the lid 12 of the container 1. Each member will be described in detail below.

3-1. Inner Cylinder

Figure 5:
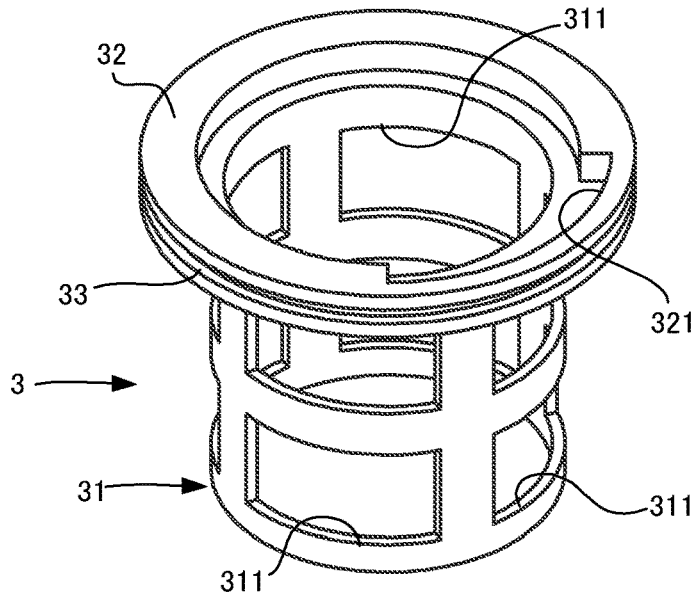
FIG. 5 is a perspective view of an inner cylinder.

FIG. 5 is a perspective view of the inner cylinder as viewed from above. As shown in FIG. 5, the inner cylinder 3 includes a cylindrical circumferential wall portion 31 whose upper and lower portions are open, and a flange portion 32 that is circular in a plan view and extends outward in the radial direction from the upper end of the peripheral wall portion 31. A plurality of rectangular through-holes 311 are formed in the circumferential wall portion 31, and the outside and the inner space of the inner cylinder 3 are in communication with each other via the through-holes 311. A recessed portion (not shown) is formed over the entire outer circumferential surface of the flange portion 32 in the circumferential direction, and an annular O-ring 33 is fitted in this recessed portion. As will be described later, the outer circumferential surface of the flange portion 32 of the cartridge 2 is detachably fixed to the inner circumferential surface of the attachment portion 121 of the lid 12. At this time, due to the O-ring 33 being disposed between the outer circumferential surface of the flange portion 32 and the inner circumferential surface of the attachment portion 121, both are fixed in a liquid-tight manner. An arc-shaped recess 321 is formed in a portion of the upper surface of the flange portion 32. Note that although there is no particular limitation on the material forming the inner cylinder 3, the inner cylinder 3 can be made of various materials such as resin materials and metals, for example. The same applies also to the outer cylinder 4 and the container 1.

3-2. Inner Cylinder

Figure 6:
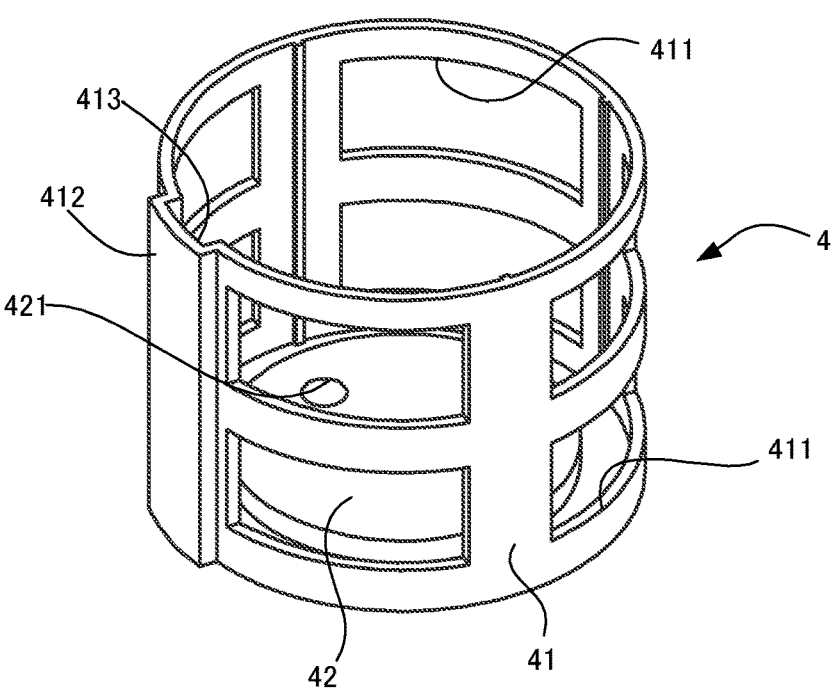
FIG. 6 is a perspective view of an outer cylinder as viewed from above.
Figure 7:
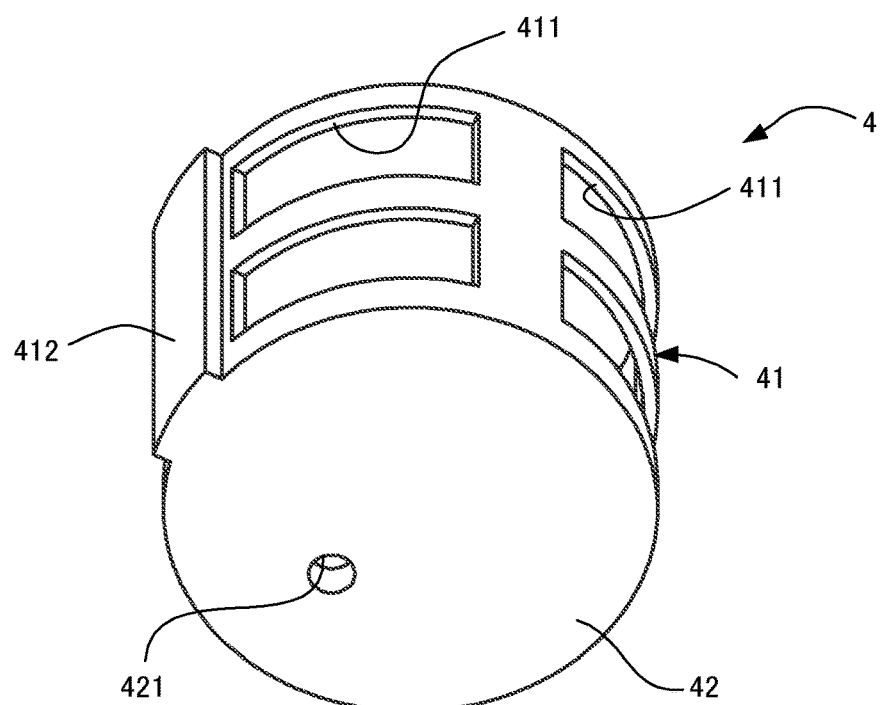
FIG. 7 is a perspective view of the outer cylinder as viewed from below.

FIG. 6 is a perspective view of the outer cylinder as viewed from above, and FIG. 7 is a perspective view of the outer cylinder as viewed from below. As shown in FIGS. 6 and 7, the outer cylinder 4 includes a cylindrical circumferential wall portion 41 and a closing portion 42 that closes the lower portion of the circumferential wall portion 41, and the upper portion of the circumferential wall portion 41 is open. The inner diameter of the circumferential wall portion 41 is slightly larger than the outer diameter of the circumferential wall portion 31 of the inner cylinder 3, and the filter member 5 is disposed in this gap. However, since the outer diameter of the circumferential wall portion 41 of the outer cylinder 4 is smaller than the outer diameter of the flange portion 32 of the inner cylinder 3, when the cartridge 2 is attached to the container 1, a gap is formed between the circumferential wall portion 41 of the outer cylinder 4 and the inner circumferential surface of the water storage portion 11. Accordingly, the water in the water storage portion 11 flows into the outer cylinder 4 through this gap. Also, the length in the vertical direction of the circumferential wall portion 41 is approximately the same as the length in the vertical direction of the circumferential wall portion 31 of the inner cylinder 3.

A plurality of rectangular through holes 411 are formed in the circumferential wall portion 41 of the outer cylinder 4 similarly to the inner cylinder 3, and the outside and the inner space of the outer cylinder 4 are in communication with each other via these through holes 411. Also, a protruding portion 412 extending in the axial direction is formed on part of the outer circumferential surface of the circumferential wall portion 41, and a recessed portion 413 extending in the axial direction is formed on the inner circumferential surface of the circumferential wall portion 41 so as to correspond to the protruding portion 412. Also, a circular air hole 421 is formed at a position displaced radially outward from the center of the closing portion 42, and the outside and the inner space of the outer cylinder 4 are in communication with each other via this air hole 421.

3-3. Filter Member

The filter member 5 is made of sheet-like felt, and is arranged between the inner cylinder 3 and the outer cylinder 4 as described above. Note that in the present invention, the term "felt" refers to a nonwoven fabric, and examples thereof include needle-punched nonwoven fabrics and wet papermaking nonwoven fabrics. The same also applies to the second embodiment, which will be described later. Also, the thickness of the filter member 5 is, for example, preferably 1 to 5 mm, and more preferably 2 to 4 mm. Also, the apparent density of the filter member 5 is, for example, 0.05 to 0.25 g/cm$^3$, and preferably 0.05 to 0.15 g/cm$^3$.

Figure 8:
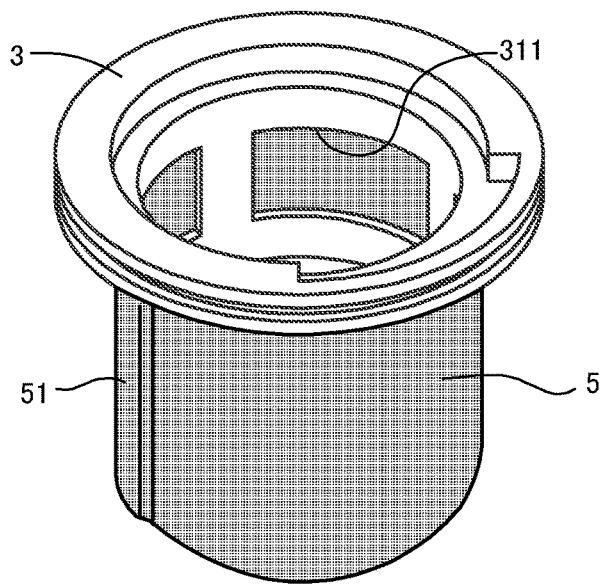
FIG. 8 is a perspective view of the inner cylinder around which a filter member is wrapped.
Figure 9:
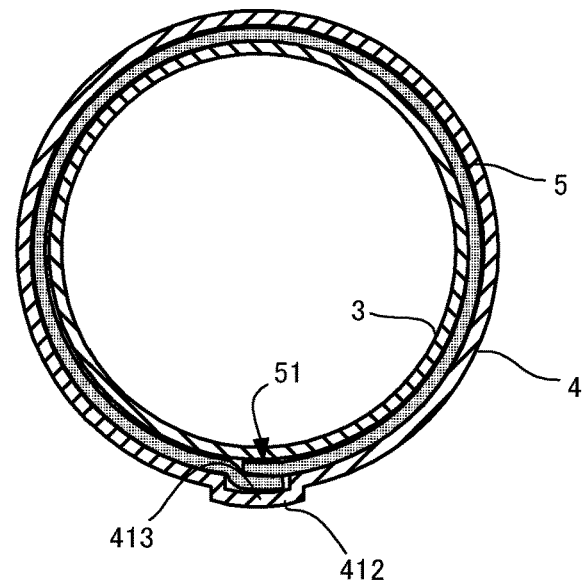
FIG. 9 is a view taken along line A-A in FIG. 3.

FIG. 8 is a perspective view of an inner cylinder to which a filter member is attached, and FIG. 9 is a cross-sectional view taken along line A-A of FIG. 3. As shown in FIG. 8, the filter member 5 is wrapped around the outer surface of the circumferential wall portion 31 of the inner cylinder 3. For this reason, the length in the vertical direction of the filter member 5 is approximately the same as the length in the vertical direction (axial direction) of the circumferential wall portion 31 of the inner cylinder 3. Also, the length in the circumferential direction of the filter member 5 is slightly longer than the length in the circumferential direction of the circumferential wall portion 31. For this reason, when the filter member 5 is wrapped around the circumferential wall portion 31, one end portion and the other end portion in the circumferential direction overlap with each other, and this overlapping portion 51 is fixed by an adhesive, heat-sealing, or the like. Accordingly, this overlapping portion 51 swells more than other portions and extends along the axial direction of the circumferential wall portion 31. Then, as shown in FIG. 9, the overlapping portion 51 is disposed in the recessed portion 413 of the circumferential wall portion 41 of the outer cylinder 4.

There is no particular limitation on the material forming the filter member 5 as long as it can filter water, but for example, it can be made of felt made of activated carbon fibers. The felt can contain granular activated carbon, zeolite, ion-exchange fibers, ion-exchange resin, chelate fibers, ceramic, calcium sulfite, hollow fibers, and the like, in addition to activated carbon fibers. Among these, from the viewpoint of further improving the antibacterial properties of the felt during storage of the water purifier of the present invention, it is preferable to include activated carbon fibers that do not carry an antibacterial agent and one or more selected from the group consisting of activated carbon fibers, activated carbon, and zeolite, which carry an antibacterial agent, and from the viewpoint of making it easier to maintain antibacterial properties even after long-term use, it is more preferable to include activated carbon fibers that do not carry an antibacterial agent and activated carbon fibers or granular activated carbon into which an antibacterial agent is kneaded. The antibacterial agent kneaded into the activated carbon is preferably, for example, one or more metal elements or metal compounds selected from the group consisting of silver, zinc and copper, and the metal compounds are preferably metal salts. Silver salts include silver nitrate, silver acetate, silver sulfate, and silver acetylacetonate, zinc salts include zinc nitrate, zinc acetate, and zinc sulfate, and copper salts include copper nitrate, copper acetate, and copper sulfate. Also, the felt preferably contains a binder component, and examples of the binder component include pulp and heat-fusible fibers.

3-4. Assembly of Cartridge

Figure 10:
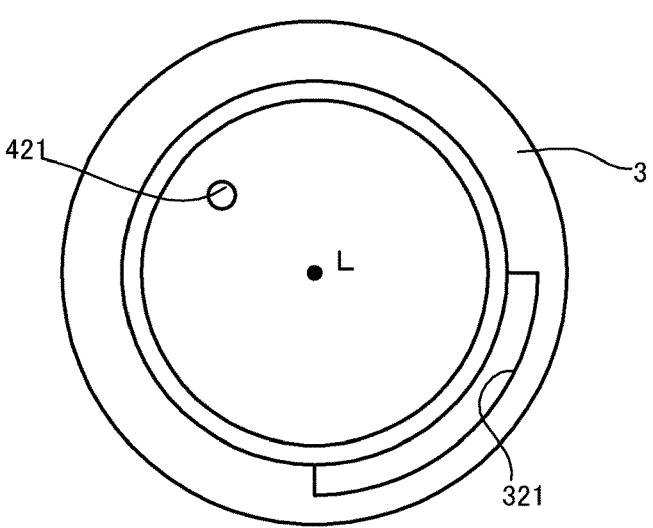
FIG. 10 is a plan view for describing assembly of the cartridge.

Next, assembly of the cartridge will be described with reference to FIG. 10 as well. FIG. 10 is a plan view of the cartridge. First, as shown in FIG. 8, the filter member 5 is wrapped around the circumferential wall portion 31 of the inner cylinder 3, one end portion and another end portion in the circumferential direction of the filter member 5 overlap each other, and the overlapping portion 51 is fixed by adhesive or heat-sealing, or the like. Next, the inner cylinder 3 with the filter member 5 attached thereto is fitted into the outer cylinder 4. In this process, as shown in FIG. 10, the recess 321 of the flange portion 32 of the inner cylinder 3 and the air hole 421 of the outer cylinder 4 are adjusted to be located opposite to each other across an axis L of the inner cylinder 3. Thus, assembly of the cartridge is completed.

4. Method for Using Water Purifier

Next, a method for using the water purifier configured as described above will be described. First, the flange portion 32 of the cartridge 2 is fitted into the inner circumferential surface of the attachment portion 121 of the lid 12. At this time, positioning in the circumferential direction is performed such that the recess 321 of the flange portion 32 is disposed on the same side as the drinking port 123 of the lid 12. Thus, when the cartridge 2 is attached to the lid 12, the inner space of the inner cylinder 3 of the cartridge 2 is liquid-tightly closed by the lid body 122 of the lid 12, and therefore a closed space is formed.

Figure 11:
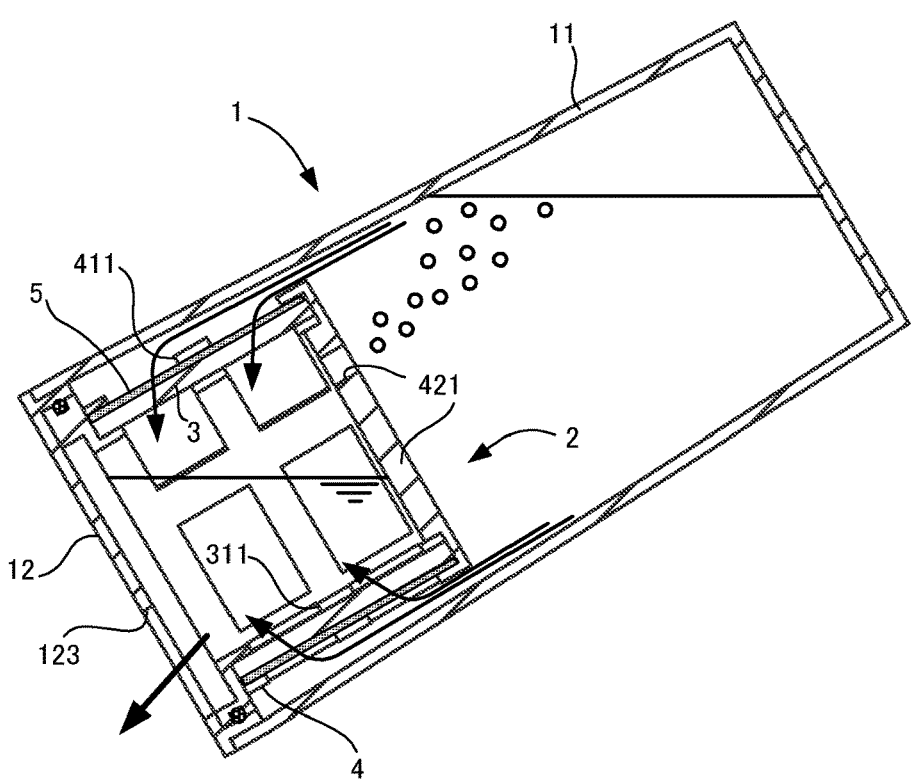
FIG. 11 is a cross-sectional view for describing how to use the water purifier.

Next, after water is stored in the water storage portion 11, the lid 12 to which the cartridge 2 is attached is attached to the water storage portion 11. When the user drinks the water in the water purifier, the user tilts the water purifier such that the drinking port 123 faces downward while the drinking port 123 is in contact with the user's mouth, as shown in FIG. 11.

As a result, the water stored in the water storage portion 11 passes from the through hole 411 of the outer cylinder 4 of the cartridge 2 and through the through hole 311 of the inner cylinder 3 via the filter member 5, and enters the inner space of the inner cylinder 3. Then, the water that has entered this inner space is discharged from the drinking port 123 of the lid 12 and is drunk by the user. In this process, the water is filtered by passing through the filter member 5, becomes purified water, and enters the inner space of the inner cylinder 3. This purified water is discharged from the drinking port 123, but outside air flows in from the drinking port 123 and enters the inner space. Then, the air accumulated in the inner space is discharged from an air hole 421 into the water storage portion 11. As a result, the purified water in the inner space is smoothly discharged from the drinking port 123.

Note that the cartridge 2 can be replaced when the water purification function degrades, such as when the filter member 5 is clogged. That is, the cartridge 2 can be removed from the lid 12 and a new cartridge 2 can be attached to the lid 12.

5. Characteristics

As described above, according to the water purifier according to this embodiment, the following effects can be obtained.

(1) In this embodiment, the cartridge 2 has the cylindrical inner cylinder 3 and the outer cylinder 4, and the sheet-like filter member 5 is attached between the circumferential wall portions 31 and 41 thereof. That is, since the filter member 5 is formed in a cylindrical shape, the surface area through which water passes in the filter member 5 can be increased. As a result, the filtering speed can be increased and the life of the filter member 5 can be extended. In particular, if the outer diameter of the cartridge 2 is increased, the surface area of the filter member 5 can be increased, and therefore the filtering speed can be further increased, and the life of the filter member 5 can be further extended.

(2) Since the filter member 5 is formed in a sheet shape and has a small thickness, the pressure loss of water passing through can be reduced. Accordingly, the filtering speed can be improved, and purified water can be drunk quickly.

(3) Since the air hole 421 of the outer cylinder 4 is formed on the opposite side of the drinking port 123 of the lid 12 with respect to the axis L, the air in the inner space of the inner cylinder 3 can be discharged efficiently. That is, when water is to be drunk, if the container 1 is tilted such that the drinking port 123 faces downward, the air hole 421 is positioned relatively above the cartridge 2. For this reason, it is easier for the air to escape. In particular, in the inclined container 1, since the air hole 421 is positioned above the center in the vertical direction of the filter member 5, obstruction of the discharge of air by the water passing through the filter member 5 is suppressed.

6. Modified Examples

Although the first embodiment of the present invention has been described above, the present invention is not limited to the first embodiment, and various modifications are possible without departing from the gist thereof. Note that the following modified examples can be combined as appropriate.

(1) The filter member 5 may be other than felt. For example, the filter member 5 may be a cloth made of activated carbon fibers, block carbon obtained through compression molding of granular activated carbon, or granular activated carbon packed in a bag. Also, the shape of the filter member 5 is not particularly limited, and instead of a filter member having a constant thickness, a filter member having a variable thickness can also be used. The same also applies to the second embodiment, which will be described later.

(2) In the above-described embodiment, the outer cylinder 4 is provided with the closing portion 42, but the inner cylinder 3 may be provided with a closing portion. That is, it is sufficient that a cylindrical inner space is formed in the cartridge 2 and an air hole is formed in the closing portion that closes the inner space from below.

(3) The outer shape of the cartridge 2 need not be cylindrical, and may be a rectangular cylinder (or polygonal cylinder), or may have a cross section with an irregular shape. Also, in the above-described embodiment, a plurality of through holes 311 and 411 through which water passes are formed in the inner cylinder 3 and the outer cylinder 4, but the present invention is not limited to this. That is, since it is sufficient for water to pass through these circumferential wall portions 31 and 41, the circumferential wall portions of the inner cylinder 3 and the outer cylinder 4 can also be made of, for example, a porous material.

(4) In the above-described embodiment, the filter member 5 is provided between the inner cylinder 3 and the outer cylinder 4, but the cartridge 2 does not necessarily need to have the inner cylinder 3 and the outer cylinder 4, and it is sufficient that the cartridge 2 is formed by a support formed in a cylindrical shape, and the filter member 5 is supported on at least one of the inner and outer sides of the circumferential wall so that water can pass through. In this case, a filter member formed into a cylindrical shape in advance may be used. However, the form and attachment method of the filter member are not particularly limited, and for example, the filter member may be attached to part of the circumferential wall portion instead of the entirety thereof. Also, the filter member may be detachably attached to the support so that it is possible to replace only the filter member.

(5) The means for attaching and detaching the cartridge 2 to and from the cover 12 is not particularly limited. The cartridge 2 need only be attached to the lid body 12 such that at least a gap through which water passes is formed between the outer circumferential surface of the cartridge 2 and the inner circumferential surface of the water storage portion 11. Accordingly, the cartridge 2 does not necessarily need the flange portion 32.

(6) The position of the air hole 421 is not particularly limited, but it is preferable to provide the air hole 421 on the opposite side of the inner cylinder 3 across the axis L as described above. The same also applies to the second embodiment, which will be described later.

(7) In the above-described embodiment, as an embodiment of the container of the present invention, a container (tumbler) on which the user directly puts his or her mouth to drink water was shown, but there is no limitation to this, and the shape and application of the container are not particularly limited as long as stored water is filtered by the cartridge and discharged. Also, the container need only have a water storage portion for storing water, and a lid that closes the opening at the upper portion and has a discharge port. The configuration of the lid is not particularly limited as long as the cartridge can be detachably attached to the lid and the above-described closed space can be formed.

B. Second Embodiment

1. Overview of Water Purifier

Figure 12:
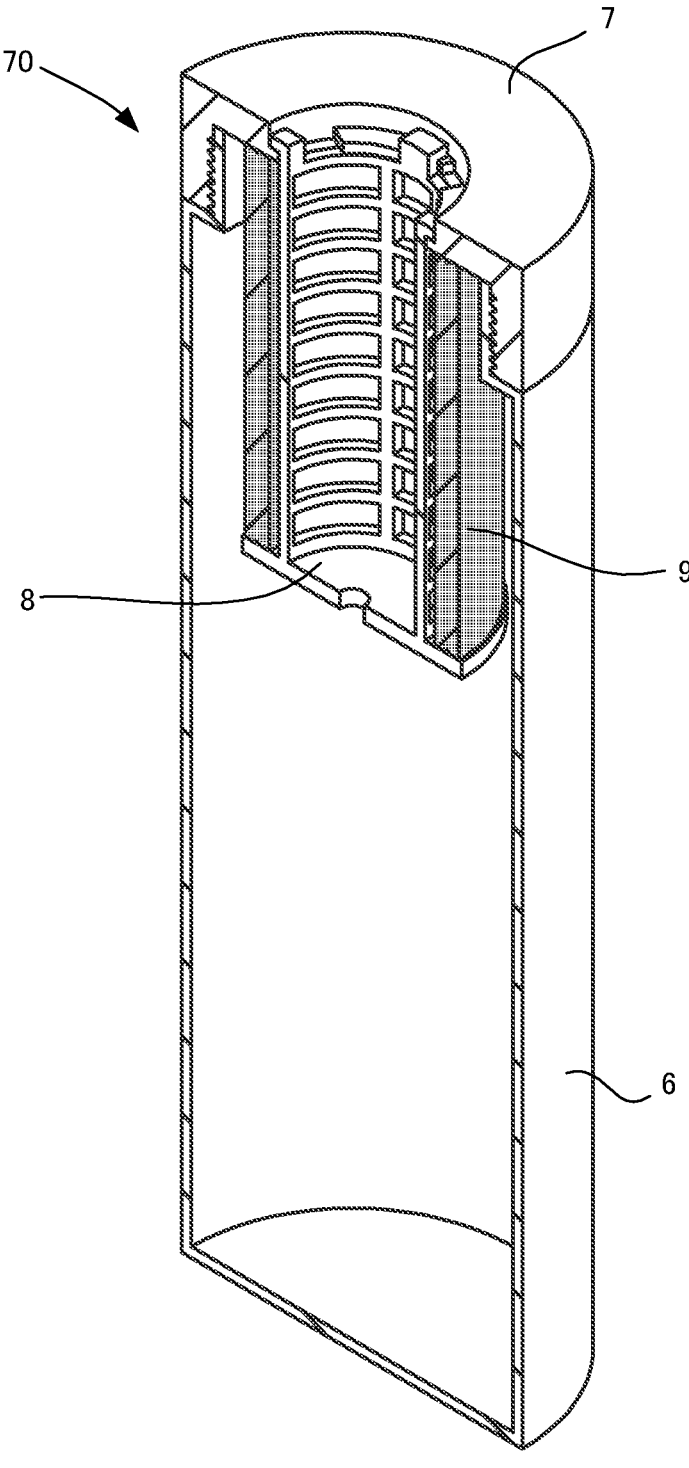
FIG. 12 is a partial cutaway perspective view showing a second embodiment of the water purifier of the present invention.
Figure 13:
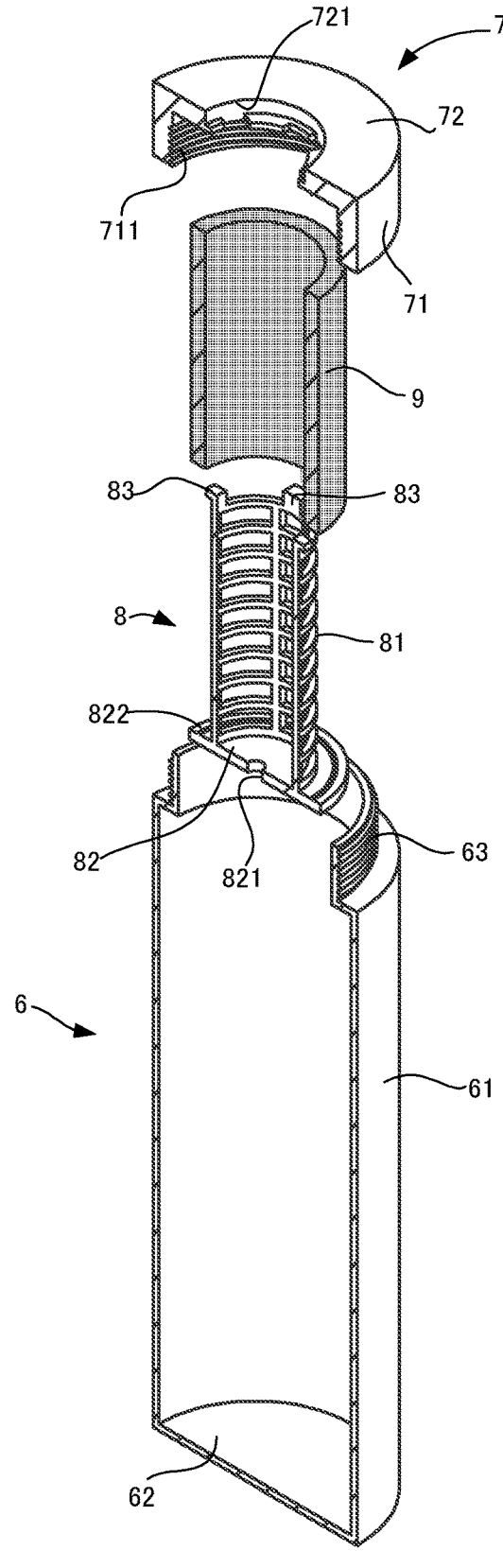
FIG. 13 is an exploded perspective view of FIG. 12.

An embodiment of a water purifier having a water puri- fying member according to the present invention and a water storage portion to which the water purifying member is attached will be described below with reference to the drawings. FIG. 12 is a partially cut-away perspective view of the water purifier according to this embodiment, and FIG. 13 is an exploded perspective view of FIG. 12. As shown in FIG. 12, this water purifier includes a tumbler-shaped water storage portion 6 and a water purification member 70 attached thereto. These will be described in detail below.

2. Water Storage Portion

As shown in FIG. 13, the water storage portion 6 has a cylindrical outer wall portion 61 and a bottom wall portion 62 closing the lower end portion of the outer wall portion 61 so as to store water, and the upper portion of the water storage portion 6 is open. A male screw 63 for attaching the lid 7 of the water purifying member 70 described below is formed on the upper end portion of the outer wall portion 61.

3. Water Purifying Member

As shown in FIGS. 12 and 13, the water purifying member 70 includes a lid 7 that detachably closes the opening at the upper portion of the water storage portion 6, a support 8 attached to the lower side of the lid 7, and a filter member 9 detachably attached to the support 8. These will be described in detail below.

3-1. Lid

Figure 14:
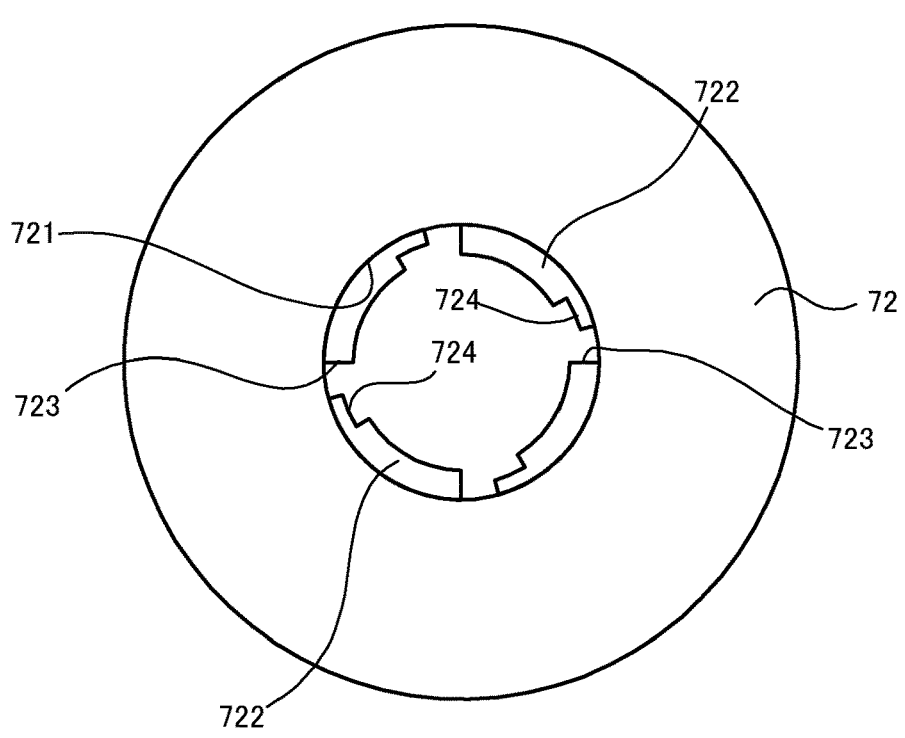
FIG. 14 is a plan view of a lid.
Figure 15:
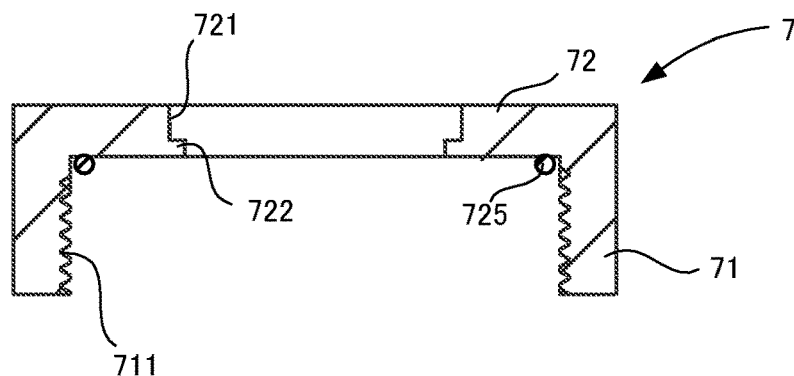
FIG. 15 is a cross-sectional view of FIG. 14.

FIG. 14 is a plan view of the lid, and FIG. 15 is a cross-sectional view of FIG. 14. As shown in FIGS. 12 to 15, the lid 7 has a cylindrical attachment portion 71 and a disk-shaped lid body 72 that closes the upper portion of the attachment portion 71. The attachment portion 71 is detach- ably attached to the opening at the upper portion of the water storage portion 6. For this reason, a female thread 711 that is screwed onto the male thread 63 of the water storage portion 6 is formed on the inner wall surface of the attach- ment portion 71. An annular O-ring 725 is attached over the entire circumferential direction to a portion of the lower surface of the lid body 72 that comes into contact with the upper end surface of the outer wall portion 61 of the water storage portion 6, and the lid 7 and the water storage portion 6 are fixed to each other in a liquid-tight manner by the O-ring 725. Note that the method for fixing the attachment portion 71 and the water storage portion 6 to each other is not particularly limited as long as the attachment portion 71 and the water storage portion 6 are detachable, and various modes other than the screw type can be employed.

A circular outlet 721 is formed in the center of the lid body 72. At the lower portion of the inner wall surface of the outlet 721, four arc-shaped protrusions 722 protruding inward in the radial direction are formed with gaps 723 in the circumferential direction. That is, the gaps 723 between the protrusions 722 are formed at intervals of 90 degrees in the circumferential direction. Also, a notch 724 extending in the circumferential direction is formed in a portion adjacent to the gap 723 at one end portion in the circumferential direction of each protrusion 722.

3-2. Support

Figure 16:
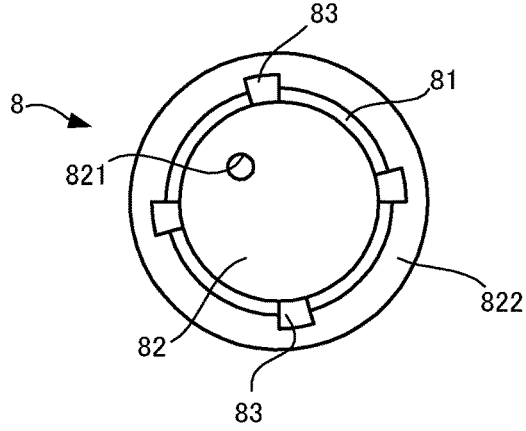
FIG. 16 is a plan view of a support.
Figure 17:
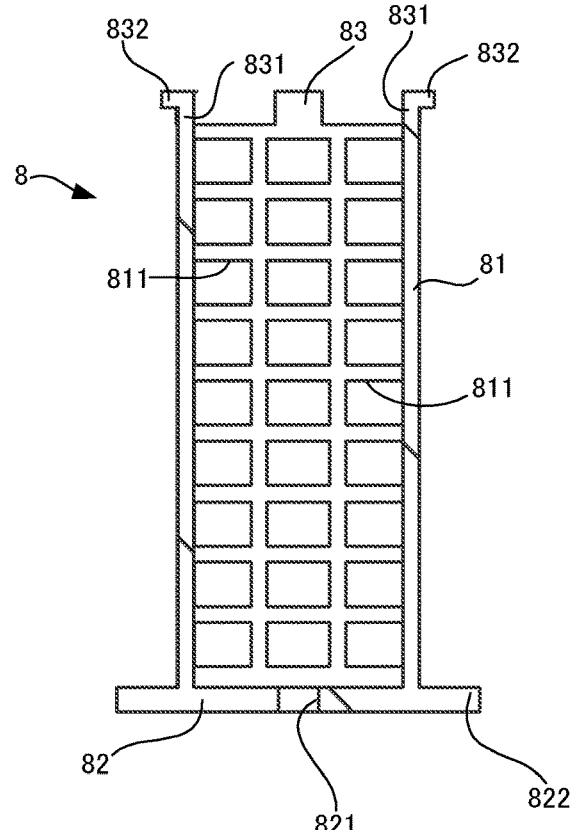
FIG. 17 is a cross-sectional view of FIG. 16.

FIG. 16 is a plan view of the support, and FIG. 17 is a cross-sectional view of FIG. 16. As shown in FIGS. 13, 16, and 17, the support 8 includes a cylindrical circumferential wall portion 81 and a closing portion 82 that closes the lower portion of the circumferential wall portion 81, and the upper portion of the circumferential wall portion 81 is open. A plurality of rectangular through holes 811 are formed in the circumferential wall portion 81, and the outside and the inner space of the support 8 are in communication with each other via the through holes 811. Also, four engaging portions 83 are formed at intervals of 90 degrees in the circumfer- ential direction on the upper end of the circumferential wall portion 81, and these engage with the protrusions 722 of the lid 7 described above. Each engaging portion 83 has a first portion 831 extending upward and a second portion 832 protruding outward in the radial direction from the first portion 831.

A circular air hole 821 is formed in the closing portion 82 at a position displaced outward in the radial direction from the center thereof, and the outside and the inner space of the support 8 are in communication with each other through the air hole 821. Also, a flange portion 822 that protrudes outward in the radial direction relative to the circumferential wall portion 81 is formed around the closing portion 82.

3-3. Filter Member

The filter member 9 is formed in a cylindrical shape with open upper and lower ends in the axial direction, and is formed by laminating a plurality of layers of sheet-like felt. The inner diameter of this filter member 9 is larger than the outer diameter of the engaging portions 83 of the support 8, and the outer diameter of the filter member 9 is smaller than the outer diameter of the flange portion 822 of the support 8. The thickness of the filter member 9 is, for example, preferably 3 to 12 mm, and more preferably 5 to 9 mm. Also, the apparent density of the filter member 5 is, for example, 0.10 to 0.40 g/cm$^3$, and preferably 0.10 to 0.20 g/cm$^3$.

4. Method for Assembling Water Purifying Member

Figure 18:
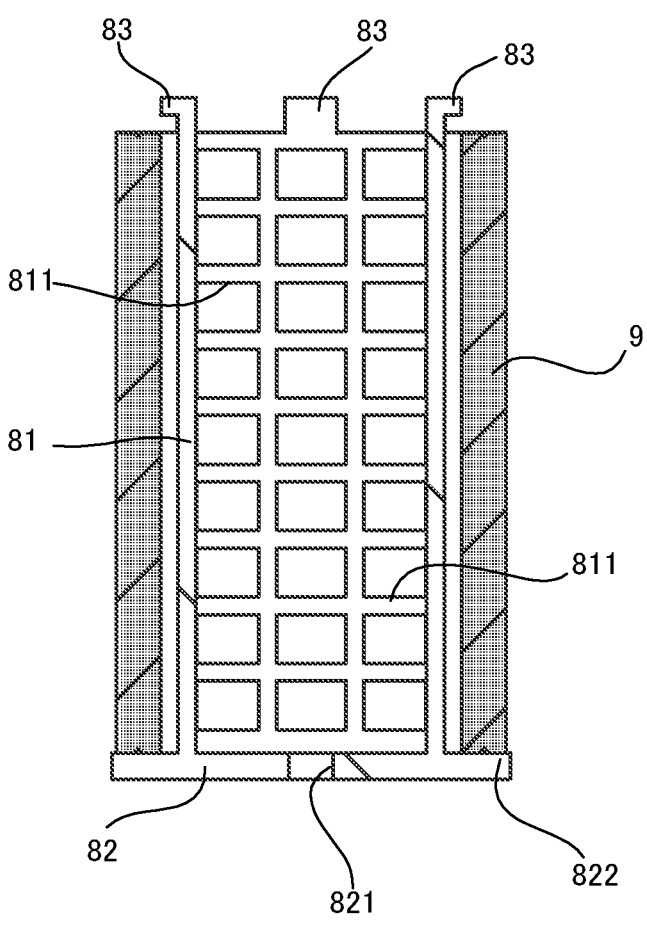
FIG. 18 is a cross-sectional view of the support and the filter member.

Next, a method for assembling the water purifying mem- ber will be described. First, as shown in FIG. 18, the circumferential wall portion 81 of the support 8 is inserted into the inner space of the filter member 9, and the lower end portion of the filter member 9 is supported by the flange portion 822.

Figure 19:
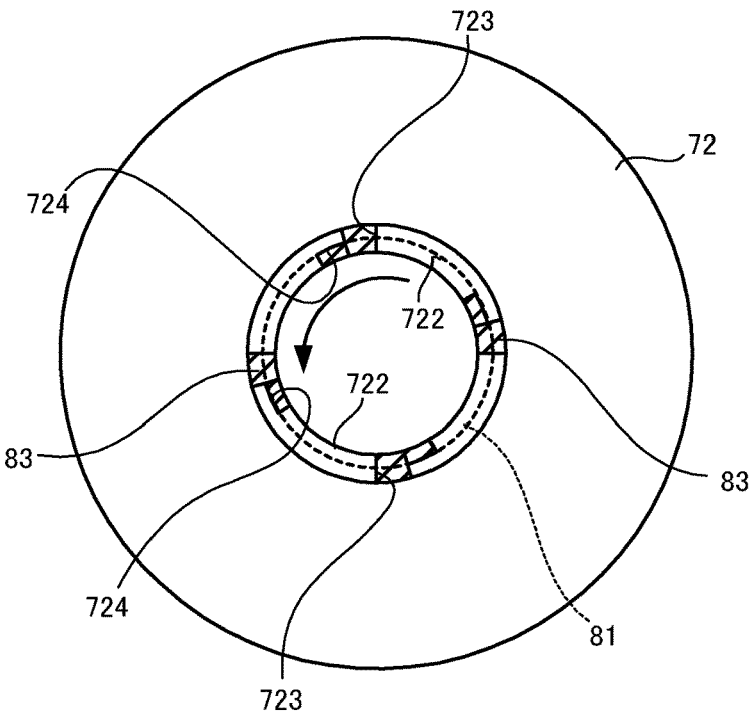
FIG. 19 is a plan view of the lid and the support.
Figure 20:
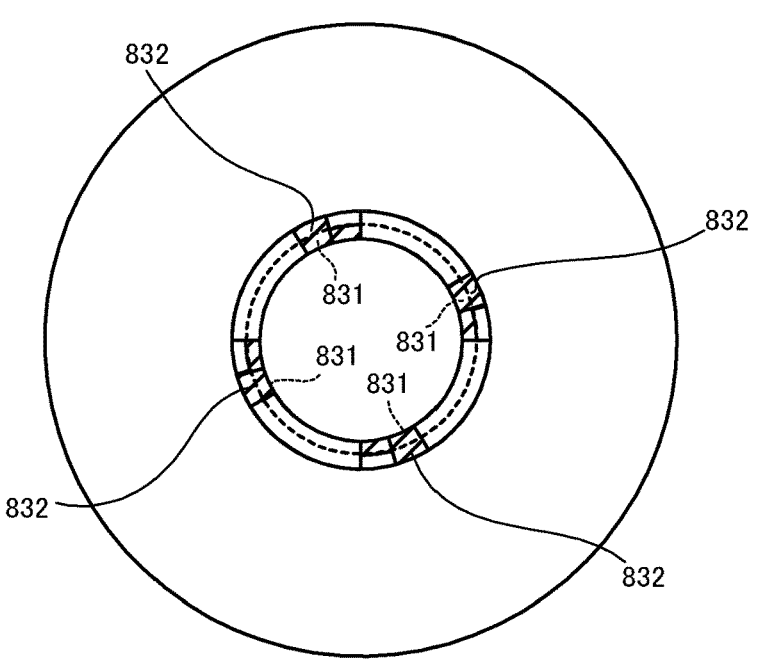
FIG. 20 is a plan view of the lid and the support.

Next, the lid 7 is attached to the support 8. This will be described with reference to FIGS. 19 to 21. FIGS. 19 and 20 are plan views of the lid and the support. However, in these drawings, the support 8 is hatched for convenience of description. Also, FIG. 20 is a cross-sectional view of the water purifying member after assembly.

Figure 21:
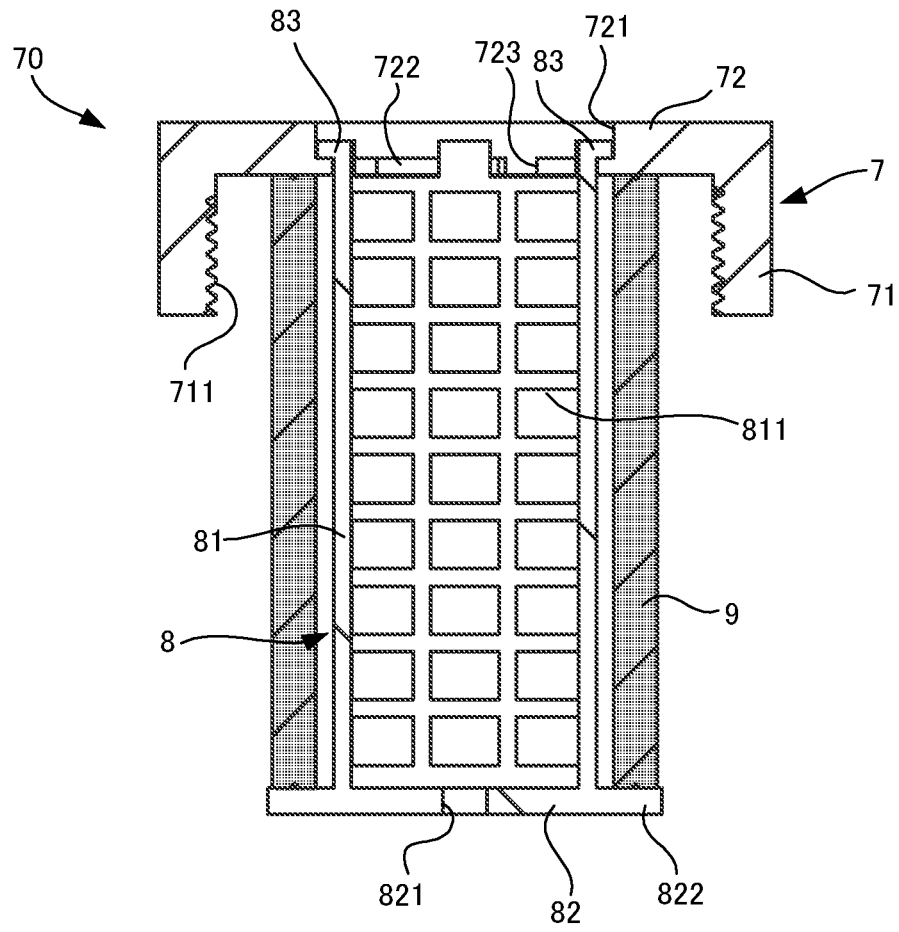
FIG. 21 is a cross-sectional view of the water purifying member after assembly.

First, as shown in FIG. 19, the four engagement portions 83 of the support 8 are positioned below the four gaps 723 of the lid 7, and the engaging portions 83 are inserted into the gaps 723. At this time, the second portions 832 of the engaging portions 83 are positioned above the protrusions 722 of the lid 7. Following this, the support 8 is rotated counterclockwise. Accordingly, as shown in FIG. 20, the first portions 831 of the engaging portions 83 are engaged with the notches 724, and the second portions 832 are engaged with the upper surfaces of the protrusions 722. In this way, the engaging portions 83 are prevented from coming off, and the support 8 is fixed to the lid 7. Also, at this time, as shown in FIG. 21, the upper end surface of the filter member 9 comes into contact with the lower surface of the lid body 72. As a result, the filter member 9, the closing portion 82, and the flange portion 822 form a space into which purified water flows. Thus, assembly of the water purification member 70 is completed.

5. Method for Using Water Purifier

Figure 22:
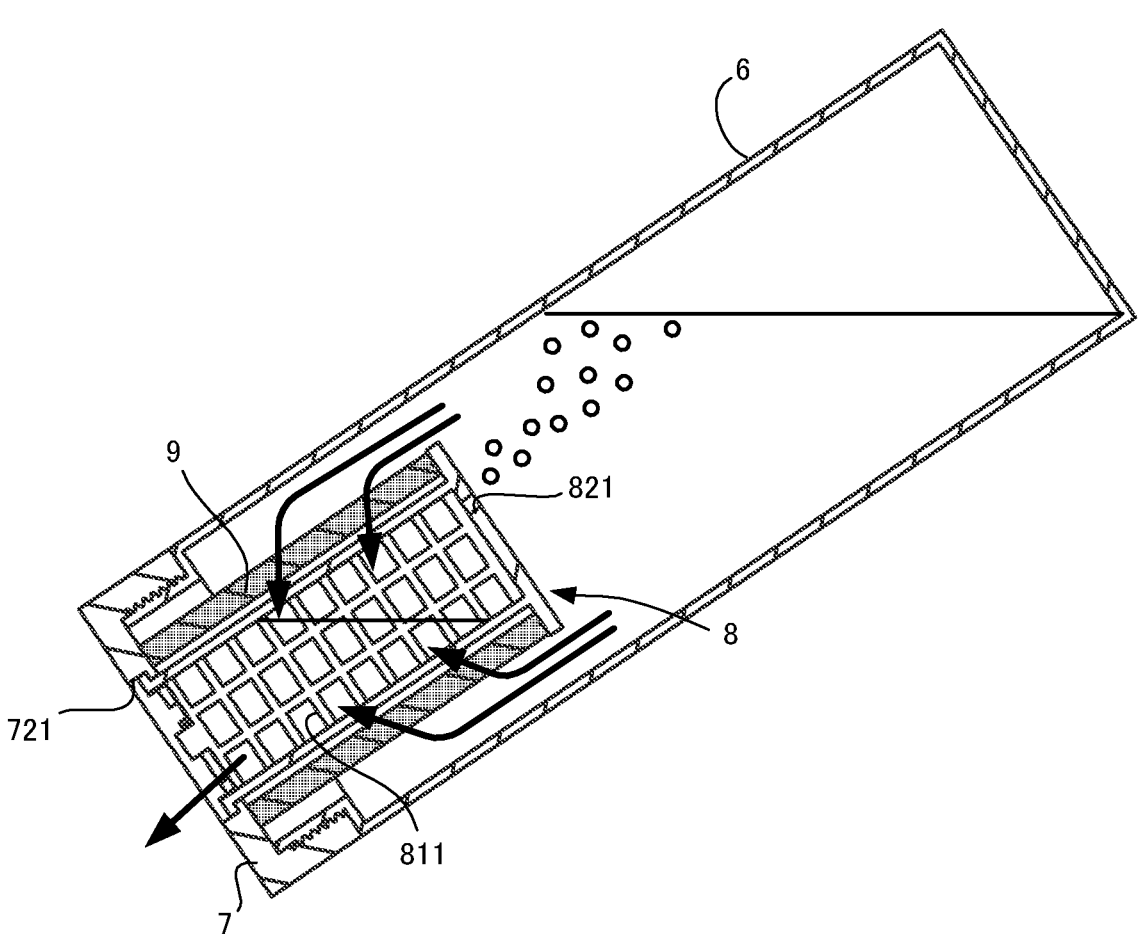
FIG. 22 is a cross-sectional view for describing how to use the water purifier.

Next, the method for using the water purifier configured as described above will be described. First, after water is stored in the water storage portion 6, the water purification member 70 is attached to the water storage section 6 as shown in FIG. 12. Then, when discharging the water in the water purifier, the water purifier is tilted such that the outlet 721 faces downward as shown in FIG. 22.

As a result, the water stored in the water storage portion 6 passes through the through hole 811 of the support 8 via the filter member 9 of the water purifying member 70 and enters the inner space of the circumferential wall portion 81. Then, the water that has entered this inner space is discharged from the outlet 721 of the lid 7. In this process, due to passing through the filter member 9, the water is filtered, becomes purified water, and enters the inner space of the circumferential wall portion 81. This purified water is discharged from the outlet 721, but outside air flows in from the outlet 721 and enters the inner space. Then, the air accumulated in the inner space is discharged from the air hole 821 into the water storage portion 6. As a result, the purified water in the inner space is smoothly discharged from the outlet 721.

Note that when the water purifying function deteriorates due to clogging of the filter member 9 or the like, it is possible to replace only the filter member 9. That is, after removing the support 8 from the lid 7 and removing the filter member 9 from the support 8, a new filter member 9 can be attached to the support 8.

6. Characteristics

As described above, according to the water purifier according to this embodiment, the following effects can be obtained.

(1) In this embodiment, it is possible to obtain the same effects as (1) to (3) shown in the effects section of the first embodiment.

(2) Since the filter member 9 is detachable from the support 8 and the cover 7 is detachable from the support 8, it is possible to replace only the filter member 9. Accordingly, since the support 8 and the lid 7 can be used repeatedly, it is possible to provide the water purification member 70 that is environmentally friendly.

7. Modified Examples

Although the second embodiment of the present invention has been described above, the present invention is not limited to this embodiment, and various modifications are possible without departing from the gist thereof. Note that the following modified examples can be combined as appropriate.

(1) In the present embodiment, a lid member that closes the outlet 721 of the lid 7 in an openable and closeable manner is omitted, but can be provided as appropriate. Also, the shape of the outlet 721 or the cover member covering the outlet 721 can be adjusted such that the user can put his or her mouth directly on the outlet 721 to drink the purified water.

(2) The method for fixing the support 8 and the lid 7 to each other is not particularly limited, and may be a method other than performing fixing with the engaging portions 83 and the protrusions 722 as described above, and it is sufficient that the support 8 and the lid 7 are detachably fixed to each other.

(3) In the present embodiment, the filter member is disposed so as to cover the outer surface of the circumferential wall portion 81 of the support 8, but the filter member may be disposed so as to cover the inner surface.

(4) The shape of the water storage portion 6 to which the water purifying member 70 of the present embodiment is attached is not particularly limited as long as it can store water and the lid body 7 can be detachably attached. Also, the shape of the lid 7 can be appropriately changed according to the shape of the water storage portion 6.

LIST OF REFERENCE NUMERALS

1 Container (tumbler)
11 Water storage portion
12 Lid
123 Drinking port (outlet)
2 Cartridge
3 Inner cylinder
31 Circumferential wall portion
4 Outer cylinder
41 Circumferential wall portion
413 Recessed portion
42 Closing portion
421 Air hole
5 Filter member
6 Water storage portion
7 Lid
8 Support
9 Filter member
70 Water purifying member

The invention claimed is:

1. A water purifying member to be attached to a water storage portion having an opening at an upper portion thereof, comprising:

a lid that has an outlet for discharging water stored in the water storage portion and is configured to close the opening of the water storage portion;

a support including a circumferential wall portion formed in a cylindrical shape, a closing portion that closes one end portion in an axial direction of the circumferential wall portion and in which an air hole is formed, another end portion in the axial direction of the circumferential wall portion being open; and a cylindrical filter member that is detachably attached to the support so as to cover an outer surface of the circumferential wall portion, the outer surface of the circumferential wall portion being convex, wherein the another end portion of the support is configured to be detachably attached to the lid, and the water in the water storage portion flows into an inner space of the support via the filter member and is dischargeable from the outlet via the inner space, wherein a flange portion is formed on the one end portion side of the support;

the filter member is supported between the flange portion and the lid;

the lid has a cylindrical attachment portion and a disk-shaped lid body that closes the upper portion of the attachment portion;

the outlet is a circular outlet and formed in the center of the lid body;

at a lower portion of an inner wall surface of the outlet, a plurality of arc-shaped protrusions protruding inward in the radial direction are formed with gaps in the circumferential direction;

a notch extending in the circumferential direction is formed in a portion adjacent to each of the gaps at one end portion in the circumferential direction of each of the plurality of arc-shaped protrusions;

a plurality of engaging portions are formed at predetermined intervals in the circumferential direction on an upper end of the circumferential wall portion of the support;

each of the plurality of engaging portions has a first portion extending upward and a second portion protruding outward in the radial direction from the first portion;

the first portion of the each of the plurality of engaging portions is engaged with the notch of the each of the plurality of arc-shaped protrusions, and the second portion of the each of the plurality of engaging portions is engaged with an upper surface of the each of the plurality of arc-shaped protrusions; and

an upper end surface of the filter member comes into contact with the lower surface of the lid body.

2. The water purifying member according to claim 1, wherein a gap is formed between the outer surface of the circumferential wall portion and an inner circumferential surface of the filter member.

3. The water purifying member according to claim 1, wherein the filter member is formed by laminating a plurality of layers of sheet-like felt.

4. The water purifying member according to claim 1, wherein the thickness of the filter member is 3 to 12 mm.

5. The water purifying member according to claim 4, wherein the thickness of the filter member is 5 to 9 mm.

6. The water purifying member according to claim 1, wherein the apparent density of the filter member is 0.10 to 0.40 g/cm$^3$.

7. The water purifying member according to claim 6, wherein the apparent density of the filter member is 0.10 to 0.20 g/cm$^3$.

* * * * *